(12) United States Patent
Vijayaraj et al.

(10) Patent No.: US 10,059,902 B2
(45) Date of Patent: Aug. 28, 2018

(54) PROCESS FOR IN SITU SYNTHESIS OF DISPERSION ZNO NANOPARTICLES IN OIL

(71) Applicant: INDIAN OIL CORPORATION LIMITED, Mumbai, Maharashtra (IN)

(72) Inventors: Munusamy Vijayaraj, Faridabad (IN); Samik Kumar Hait, Faridabad (IN); Madhira Indu Sekhara Sastry, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 162 days.

(21) Appl. No.: 15/017,554

(22) Filed: Feb. 5, 2016

(65) Prior Publication Data

US 2016/0237373 A1 Aug. 18, 2016

(30) Foreign Application Priority Data

Feb. 14, 2015 (IN) ............................ 481/MUM/2015

(51) Int. Cl.

| | |
|---|---|
| *C10M 169/00* | (2006.01) |
| *C09K 3/00* | (2006.01) |
| *C01G 9/00* | (2006.01) |
| *C22B 17/00* | (2006.01) |
| *C10M 141/06* | (2006.01) |

(Continued)

(52) U.S. Cl.

CPC ........ *C10M 141/06* (2013.01); *C10M 125/10* (2013.01); *C10M 141/02* (2013.01); *C10M 161/00* (2013.01); *B82Y 30/00* (2013.01); *C10M 2201/062* (2013.01); *C10M 2201/085* (2013.01); *C10M 2203/1025* (2013.01); *C10M 2207/021* (2013.01); *C10M 2207/126* (2013.01); *C10M 2207/289* (2013.01); *C10M 2209/103* (2013.01); *C10M 2209/104* (2013.01); *C10M 2215/08* (2013.01); *C10M 2215/082* (2013.01); *C10M 2215/28* (2013.01); *C10M 2223/047* (2013.01); *C10N 2220/082* (2013.01); *C10N 2230/00* (2013.01); *C10N 2230/06* (2013.01); *C10N 2230/42* (2013.01); *C10N 2230/64* (2013.01); *C10N 2240/10* (2013.01)

(58) Field of Classification Search

CPC .......... C10M 2201/062; C01P 2006/22; C22B 19/26
USPC .............................. 508/172; 516/88; 423/101
See application file for complete search history.

(56) References Cited

U.S. PATENT DOCUMENTS

| | | |
|---|---|---|
| 5,000,863 A | 3/1991 | Watanabe |
| 6,172,012 B1 | 1/2001 | Kumar et al. |

(Continued)

FOREIGN PATENT DOCUMENTS

| | | |
|---|---|---|
| EP | 1788067 A1 | 5/2007 |
| EP | 1801190 A1 | 6/2007 |

(Continued)

*Primary Examiner* — Vishal V Vasisth
(74) *Attorney, Agent, or Firm* — Maschoff Brennan

(57) ABSTRACT

The present invention relates to a process for synthesizing dispersion of ZnO nanoparticles in an oil medium. Particularly, the invention relates to a process for in-situ synthesis of dispersion of ZnO nanoparticles in oil medium. Additionally, the present invention relates to a lubricant oil composition, wherein the composition comprises a base oil, a dispersant and the dispersion of ZnO as obtained by the process of the present invention.

11 Claims, 4 Drawing Sheets

TEM image of ZnO nanoparticles prepared in oil medium; nano dispersion made in example 2.

(51) Int. Cl.
    *C10M 141/02*     (2006.01)
    *C10M 161/00*     (2006.01)
    *C10M 125/10*     (2006.01)
    *B82Y 30/00*     (2011.01)

(56) References Cited

U.S. PATENT DOCUMENTS

| | | |
|---|---|---|
| 6,710,091 B1 | 3/2004 | Womelsdorf et al. |
| 7,649,024 B2 * | 1/2010 | Li .............................. B01J 8/10 508/165 |
| 7,709,423 B2 | 5/2010 | Esche et al. |
| 7,727,943 B2 | 6/2010 | Brown et al. |
| 7,879,774 B2 | 2/2011 | Lam et al. |
| 8,278,254 B2 | 10/2012 | Devlin et al. |
| 2005/0124504 A1 * | 6/2005 | Zhang .................... B82Y 30/00 508/128 |
| 2007/0111908 A1 | 5/2007 | Lam et al. |
| 2007/0132274 A1 | 6/2007 | Lam et al. |
| 2008/0139429 A1 | 6/2008 | Guinther |
| 2008/0236538 A1 | 10/2008 | Lam |
| 2008/0280796 A1 | 11/2008 | Guinther et al. |
| 2010/0199943 A1 | 8/2010 | Carrick |
| 2011/0207635 A1 | 8/2011 | Bartley et al. |
| 2012/0309654 A1 | 12/2012 | Bhalla et al. |

FOREIGN PATENT DOCUMENTS

| | | |
|---|---|---|
| EP | 2135925 A1 | 12/2009 |
| WO | 2009/042586 A1 | 4/2009 |
| WO | 2009/042590 A1 | 4/2009 |

\* cited by examiner

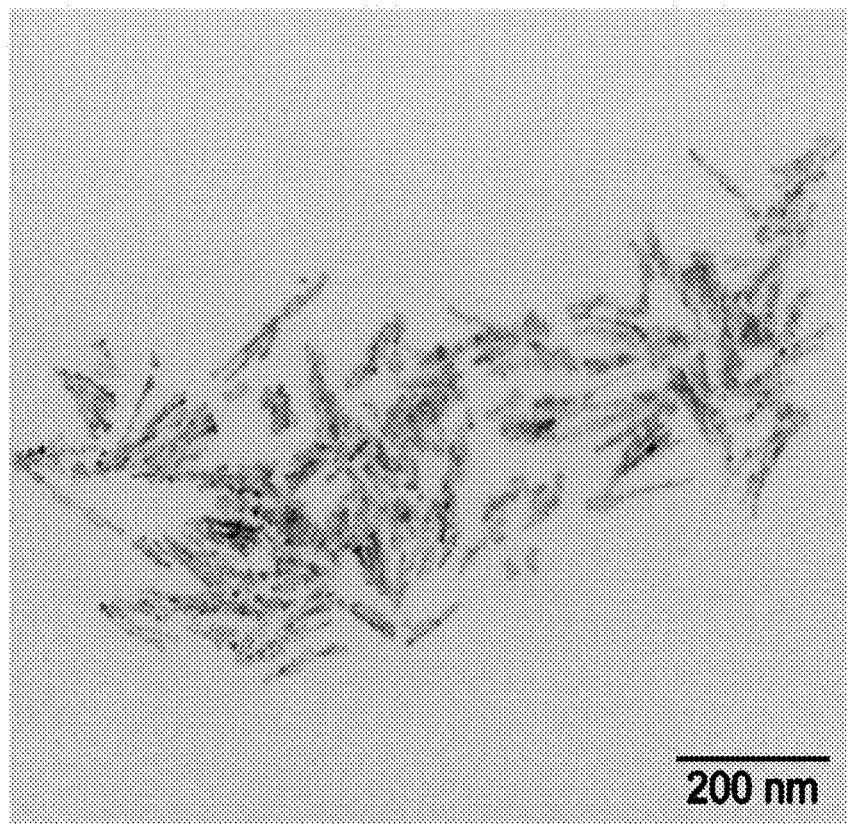
Figure 1: TEM image of ZnO nanoparticles prepared in oil medium; nano dispersion made in example 2.

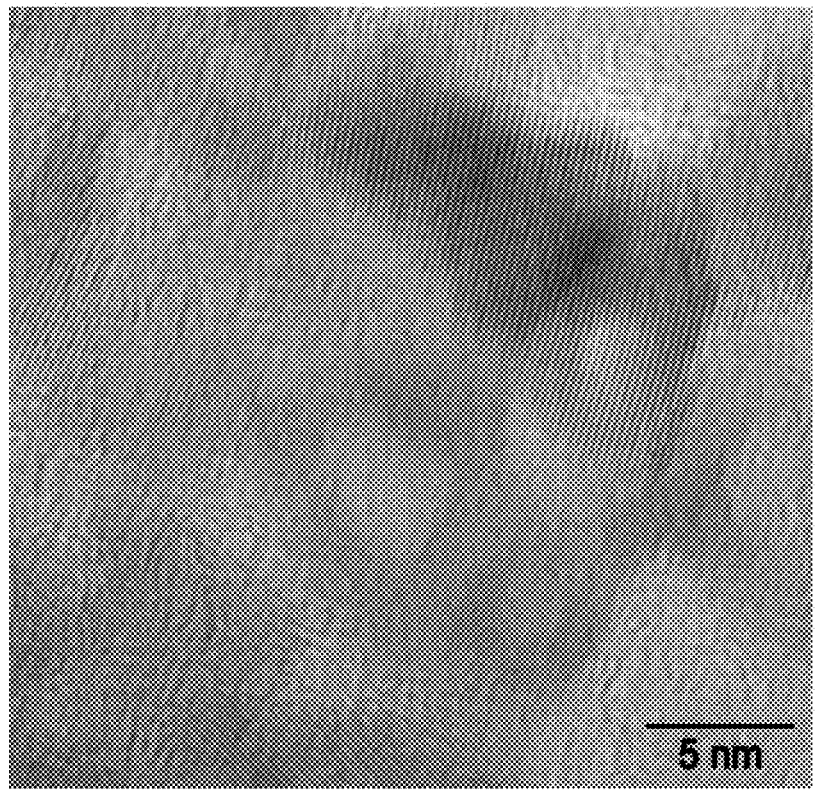
Figure 2: High resolution TEM image of ZnO nanoparticles prepared in oil medium; nano dispersion made in example 2. Preferentially oriented lattice fringes of ZnO (Zincite phase; d=2.6033 Å; 2θ=34.422) is observed.

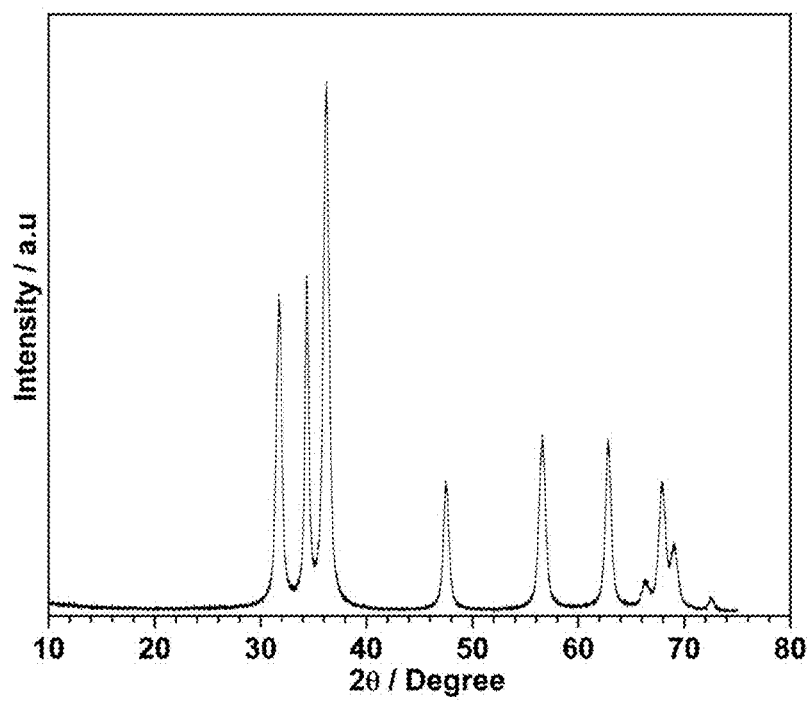
Figure 3: XRD pattern of ZnO obtained by heat treatment of LBZ at 140°C/2h; LBZ sample prepared in example 1.

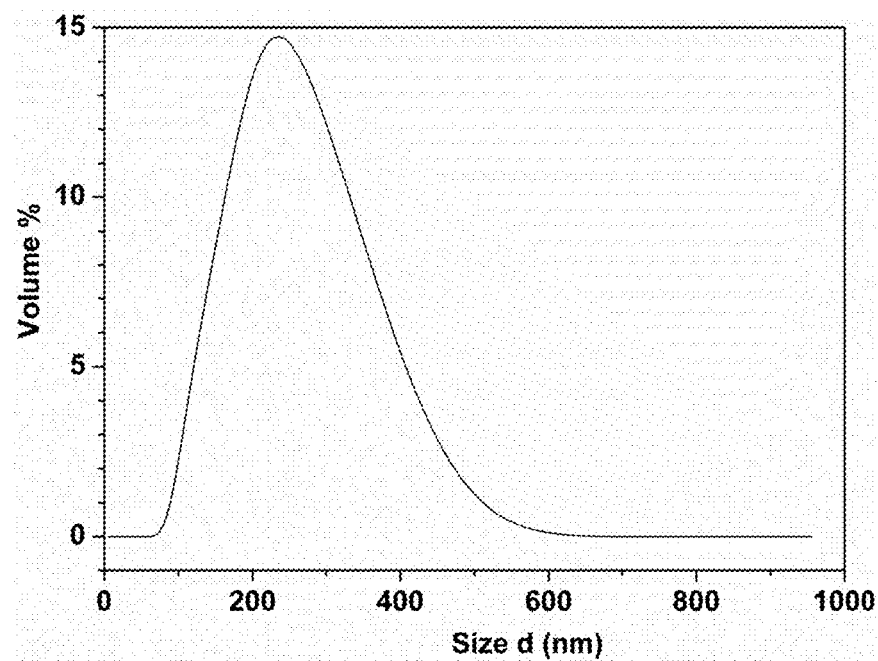
Figure 4: Particle size distribution of ZnO nanoparticles in the range 100-400 nm within oil medium.

US 10,059,902 B2

PROCESS FOR IN SITU SYNTHESIS OF DISPERSION ZNO NANOPARTICLES IN OIL

FIELD OF THE INVENTION

The present invention relates to a process for synthesizing dispersion of ZnO nanoparticles in an oil medium. Particularly, the invention relates to a process for in-situ synthesis of ZnO nanoparticles in an oil medium.

BACKGROUND OF THE INVENTION

The anti-wear (AW) and extreme pressure (EP) additives are mainly used for reducing friction and wear under boundary lubrication conditions. These additives are vital constituents of most lubricant formulations, under conditions of medium to high or extreme pressure, react with mating metal surfaces forming protective tribo-chemical layers. Thus the equipments are protected from wear and enabled to operate successfully under heavy loads.

Generally, any chemical constituent, pure or impure, intended or not, that is formed or deposited during lubrication on the metal surface, and able to separate and prevent the opposing surfaces from direct contact could theoretically be construed as AW/EP agent. Therefore, the classic AW/EP additives are oil-soluble chemicals or components which react with the metal surface forming a film that withstands both compression and, to a degree, shear. Since reaction with the metal is of the essence, only elements that can form iron compounds are truly eligible for this task. That makes compounds of sulfur, phosphorus, chlorine (or other halogens) preferential choices.

Traditionally, wear protection and friction modification by engine oil is provided by zinc dithiophosphate (ZDDP), molybdenum dithiophosphate (MoDDP) or other phosphorus compounds. These additives provide effective wear protection and friction control on engine parts through formation of a glassy polyphosphates anti-wear film. However, these additives may have one or more disadvantages such as;

1. copper and/or lead corrosion,
2. color darkening of the finished lubricant,
3. increased levels of sulfur and phosphorus in the finished lubricant.

Among these disadvantages the level of phosphorus and sulfur in the engine oil is the most serious concern. This is because the deposition of phosphorus and sulfur species on automotive three way catalytic converters from lubricants has been known for some time to have a detrimental effect on poisoning the catalysts. Future generations of passenger car motor oils and heavy duty diesel engine oils require lower levels of phosphorus and sulfur in the finished oil in order to protect the pollution control devices. Hence the limits of phosphorus and sulfur levels in engine oil are reduced and supplemental forms of AW additives will be required to replace ZDDP. For example, current GF-4 motor oil specifications require a finished oil to contain less than 0.08 and 0.7 wt % phosphorus and sulfur, respectively and PC-10 motor oil specifications, the next generation heavy duty diesel engine oil, requires to contain less than 0.12 and 0.4 wt % phosphorus and sulfur, respectively. Certain molybdenum and organo zinc additives known in the industry contain phosphorus and sulfur at levels which reduce the effectiveness of pollution control devices.

Much work has gone in to reducing the level of ZDDP in lubricants by increasing the use of known friction modifiers, other phosphorus free components or balancing the properties of many compounds but this is difficult because ZDDP is not a mono-functional additive that provides only AW chemistry but has multifunctional properties providing anti-scuffing and anti-oxidation, all in one additive component.

In addition, it has complex interactions with other additives. Another approach is to modify the ZDDP molecule to have the same activity at lower concentrations by changing the alkyl group but a stable anti-wear ZDDP film cannot be formed by the modified ZDDP at low concentrations. Nevertheless, the ability to formulate with ashless dispersants would also benefit from the replacement of ZDDP chemistry. Ashless dispersants deteriorate the anti-wear performance of ZDDP because the amount of ZDDP adsorbed onto the metal surfaces is decreased by formation of complexes with ashless dispersants in oil. Therefore, lubricant additives and/or composition that delivers spectacular anti-friction and wear properties and as well as compatible with pollution control devices used for automotive and diesel engines are highly demanded.

Such lubricant additives and/or compositions compatible with pollution control devices should also not adversely affect oil solubility, corrosion and darkening the color of the finished lubricant. With rapid development of nano-science and technology, nanoparticles have received considerable attention in recent years because of their special physical and chemical properties. Especially in the field of tribology, many kinds of inorganic nanoparticles have been successfully used in lubricating oils and greases to solve wear and friction problems. The dispersion of inorganic nanoparticles in lubricating oil is still a principal problem for application of nanomaterial additives. In order to obtain better dispersion, a surface modification technique is usually adopted to structure an organic layer on the surface of nanoparticles. As compared to the conventional additives either containing heavy metals like Zn, Mo and Pb etc., or too much sulfur and phosphorus, greener nanomaterial additives with environmentally benign characteristics are strongly required.

SUMMARY OF THE INVENTION

Accordingly, the present invention provides a process for preparing a dispersion of ZnO in an oil additive composition, wherein the process comprises the steps of:

a) dissolving a zinc salt in an alcoholic solvent and heating to 60-120° C. for 6-48 h hours to obtain a suspension;

b) centrifuging the suspension as obtained in step (a) and washing with deionized water to obtain a precipitate of layered base zinc (LBZ);

c) dispersing the layered base zinc precipitate as obtained step (b) in an alcohol and adding to base oil containing a dispersant;

d) refluxing the mixture to obtain a colloidal suspension;

e) evacuating the colloidal suspension at room temperature and heating at 60-90° C., followed by heating to 45 to 120 minutes to obtain a dispersion of ZnO in the oil medium.

In an embodiment of the present invention, the hydrous or anhydrous form of zinc salt is selected from zinc acetate, zinc nitrate; zinc chloride; zinc sulfate; zinc hydroxide (hydrotalcite); zinc hydroxy carbonate or hydrozincite; zincite and wurtzite.

In another embodiment of the present invention, the alcoholic solvent is selected from $C_1$ to $C_3$ alcohols.

In yet another embodiment of the present invention, the ratio of zinc salt and the alcoholic solvent ranges from 0.05 to 15:1 to 740.

In still another embodiment of the present invention, heating in step (a) is performed to 90° C. in an autoclave or refluxing in a glass reactor.

In further another embodiment of the present invention, the washing in step (b) is performed twice with deionized water.

In another embodiment of the present invention, the alcohol in step (c) is selected from $C_1$-$C_3$ alcohols.

In still another embodiment of the present invention, the amount of the dispersant in the base oil ranges from 40-78%.

In yet another embodiment of the present invention, the layered basic zinc salt is selected from layered basic zinc acetate, layered basic zinc nitrate; layered basic zinc chloride; layered basic zinc sulfate; layered zinc hydroxide (hydrotalcite); zinc hydroxy carbonate or hydrozincite; zincite and wurtzite.

In one another embodiment of the present invention, the dispersant is selected from PIB dispersants, Phosphorodithioic acid; Ethyl hexanoic acid or fatty acids like stearic, oleic acids; sorbitane mono oleate (SPAN 80); sorbitane mono laurate (SPAN 20); sorbitane mono stearate (SPAN 60); Tween 20 (polyoxyethylenesorbitane mono laurate); Tween 60 (polyoxyethylenesorbitane mono stearate); Tween 80 (polyoxyethylenesorbitane mono oleate); diethanolamide fatty acid and fatty acid mono glyceride.

In still another embodiment of the present invention, the base oil is a mineral oil selected from the group consisting of group I, group II, group III, group IV, group V and synthetic oils.

In yet another embodiment of the present invention, the composition comprises a base oil, a dispersant and a dispersion of ZnO as obtained by the process as claimed in claim 1.

In further another embodiment of the present invention, the amount of the base oil in the composition ranges from 20 to 98.5.

In another embodiment of the present invention, the amount of the dispersant in the composition ranges from 1.55 to 78.

In one another embodiment of the present invention, the amount of the ZnO ranges from 0.1 to 5.

In still another embodiment of the present invention, the layered basic zinc salt is selected from layered basic zinc acetate, layered basic zinc nitrate; layered basic zinc chloride; layered basic zinc sulfate; layered zinc hydroxide (hydrotalcite); zinc hydroxy carbonate or hydrozincite; zincite and wurtzite.

In one another embodiment of the present invention, the dispersant is selected from PIB dispersants, Phosphorodithioic acid; Ethyl hexanoic acid or fatty acids like stearic, oleic acids; sorbitane mono oleate (SPAN 80); sorbitane mono laurate (SPAN 20); sorbitane mono stearate (SPAN 60); Tween 20 (polyoxyethylenesorbitane mono laurate); Tween 60 (polyoxyethylenesorbitane mono stearate); Tween 80 (polyoxyethylenesorbitane mono oleate); diethanolamide fatty acid and fatty acid mono glyceride.

In another embodiment of the present invention, the base oil is a mineral oil selected from the group consisting of group I, group II, group III, group IV, group V and synthetic oils.

BRIEF DESCRIPTION OF DRAWINGS

FIG. 1 shows particle size distribution of ZnO nanoparticles in the range 100-400 nm.

FIG. 2 is high resolution image shows preferentially oriented lattice fringes of ZnO (Zincite phase; d=2.6033 Å; 2θ=34.422) whereas figure inset shows XRD of ZnO nanoparticles obtained by heating LBZA at 150° C. for 6 h.

FIG. 3 shows experimental results associated with Example 1 described herein.

FIG. 4 shows additional experimental results associated with ZnO particle size distribution, as described herein.

DESCRIPTION OF THE INVENTION

The present invention discloses aprocess for in situ synthesis of ZnO nanoparticles in a medium. Particularly, the present invention also discloses a process for in situ process for synthesizing ZnO nanoparticles in base oil.

It is well known that in the art that the decomposition of layered basic zinc (LBZ) yields flakes of porous nano ZnO. The present invention provides a two-part procedure comprising of steps discussed herein for synthesizing ZnO nanoparticles within oil medium.

For the first part of the two-part procedure, LBZ was prepared as per existing open literature procedures. In an embodiment of the present invention, LBZ was prepared by dissolving Zinc salt in an alcoholic solvent and heating to 90° C. in an autoclave or refluxing in a glass reactor for 24 hours to obtain a white suspension. The product was centrifuged and washed twice with deionized water to precipitate LBZ.

For the second part, the present invention provides a method of synthesizing ZnO Nanoparticles by decomposing LBZ in an oil medium. LBZ as obtained in the first part was dispersed in a C1-C3 alcohol and added to base oil containing 40-60% of PIB dispersant. The mixture is refluxed to give a colloidal suspension. The suspension was evacuated at room temperature in a rotavapor setup and heated to 90° C. to remove the alcohol solvent followed by heating to 140° C. for 45 to 90 minutes for LBZ decomposition to give a clear dispersion of ZnO in the oil medium along with residual anions. The evolved during decomposition were removed through vacuum stripping. Acetic acid is obtained as by-product of vacuum stripping.

In accordance with the present invention, the alcoholic solvent is selected from C1-C3 alcohols. In accordance with the present invention, the dispersant is selected from PIB dispersants, Phosphorodithioic acid; Ethyl hexanoic acid or fatty acids like stearic, oleic acids; sorbitane mono oleate (SPAN 80); sorbitane mono laurate (SPAN 20); sorbitane mono stearate (SPAN 60); Tween 20 (polyoxyethylenesorbitane mono laurate); Tween 60 (polyoxyethylenesorbitane mono stearate); Tween 80 (polyoxyethylenesorbitane mono oleate); diethanolamide fatty acid; fatty acid mono glyceride.

In accordance with the present invention, layered basic zinc salt is selected from layered basic zinc acetate, layered basic zinc nitrate; layered basic zinc chloride; layered basic zinc sulfate; layered zinc hydroxide (hydrotalcite); zinc hydroxy carbonate or hydrozincite; zincite and wurtzite. In accordance with the present invention base oil is group II base oil.

Having described the basic aspects of the present invention, the following non-limiting examples illustrate specific embodiment thereof.

Example 1

About 100 ml of liquor solution of zinc acetate dihydrate ($Zn(CH_3COO)_2 \cdot 2H_2O$) in the concentration 0.15 moles per cubic decimeter was charged in a round bottom flask fitted with a reflux condenser and heated for 24 h to give white precipitate. The precipitate was filtered and washed twice with distilled water to give fine white product layered basic zinc acetate (LBZA) of formula $Zn_5(OH)_8(CH_3COO)_2.2H_2O$. The product was re-suspended in isopropyl alcohol (25 ml) for further use.

Example 2

To a 500 ml two neck round bottom flask containing 60 g PIBSI dispersant and 16 g group II base oil added the alcohol suspension prepared from the example 1 and heated to reflux condition. The colloidal product was transferred to rotavapor flask and solvent was stripped under vacuum at 90° C. and then heated further to 140° C. under vacuum to remove decomposing acetates to give clear stable product containing 1.45 Wt % of Zn (metal content). The product could readily be dispersed in any mineral oil of lubricating viscosity.

TEM images of ZnO nanoparticles present in the oil mediumare shown in FIG. 1 and FIG. 2; The product concentrate is free of any significant acidic components (Total Acid Number (TAN)=0.657 mgKOH/g) when subjected to TAN determination as per ASTM D664.

Example 3

To a 750 ml high pressure reactor (Parr Instruments) added 300 ml alcohol solution containing zinc acetate dehydrate $(Zn(CH_3COO)_2.2H_2O)$ in the concentration 0.05 moles per cubic decimeter and heated at 95° C. for 24 h to give highly viscous colloidal white precipitate. The product was washed thoroughly by centrifuge with distilled water for three times before being mixed with 50 ml isopropyl alcohol to give a colloidal suspension for further use.

Example 4

The suspension obtained from the example 1 was mixed with 10 g of 2-ethyl hexanoic acid (EHA) and mixture was heated at 150° C. under vacuum to remove the solvent and decomposing acetates. The final product was clear and stable which could be dispersible in nonpolar medium like mineral oil. Similarly Span 80 (sorbitane mono oleate) was also used in the place of EHA in another reaction run to give Span based metal dispersion.

Example 5

The product as per Example 2 was diluted with Gr II base oil to get ppm (parts per million) level of Zn concentration in final dispersion blends which were evaluated for antiwear performance in four ball tester (Falex wear test machine) at 348K; 15 kg weight load (ASTM D4172). The tests were repeated two times (results with best precision were considered) and Wear Scar Diameter (WSD) results are summarized for neat base oil and blends in the below Table. WSD should be less for any good antiwear candidate.

TABLE 1

| Dispersant (Wt %) | Metal Concentration (ppm) Zn (ZnO) | WSD |
|---|---|---|
| 0 | 0 | 0.65 |
| 1.55 | 0 | 0.70 |
| 1.55 | 430 (534) | 0.35 |
| 1.55 | 465 (578) | 0.40 |
| 1.55 | 136$ (169) | 0.50 |

TABLE 1-continued

| Dispersant (Wt %) | Metal Concentration (ppm) Zn (ZnO) | WSD |
|---|---|---|
| 1.55 | 182* (226) | 0.45 |
| 1.55 | 500# (634) | 0.35 |
| 1.55 | 250 (312) | 0.45 |

$Span-80 and *EHA stabilized samples from example 7; #ZDDP blend.

TAN value of above blends was not detectable as per ASTM D664 indicates no significant acid components present in these blends.

Example 6

About 500 ml of liquor solution of zinc acetate dihydrate $(Zn(CH_3COO)_2.2H_2O)$ in the concentration 0.15 moles per cubic decimeter was charged in a round bottom flask fitted with a reflux condenser and heated for 24 h to give white precipitate. The precipitate was filtered and washed twice with distilled water to give fine white product layered basic zinc acetate (LBZA) of formula $Zn_5(OH)_8(CH_3COO)_2.2H_2O$. The product was resuspended in isopropyl alcohol (100 ml) and slowly (over 20 minutes) mixed at 60° C. with 50 g of Gr II base oil containing 100 g PIBSI based dispersant (M.W 1400) in a two neck round bottom flask. The reaction mixture were heated to reflux condition and transferred to a rotavapor flask to remove the solvent under vacuum at 90° C. The obtained mixture was heated further to 140° C. under vacuum for another 45 minutes to give clear product containing Zn metal in the concentration of 1.85 Wt %.

The product was top treated with formulated marine oil to get ppm (parts per million) level of Zn concentration in final dispersion blends which were evaluated for antiwear performance in four ball tester (Falex wear test machine) at 348K; 40 kg load and weld load measurement. The tests were repeated two times (results with best precision were considered) and WSD results are summarized for formulated oil and top treated blends in the below Table.

TABLE 2

| Sample | Metal Concentration (ppm) Zn (ZnO) | WSD (mm) | Weld load (Kg) |
|---|---|---|---|
| 1040 | 0 | 0.50 | 180 |
| 1040 | 500 (634) | 0.50 | 180 |

Example 7

Preparation of ZnO Dispersion by Ex Situ and Mixing Approach:
(a) 12 g of Zinc acetate-di-hydrate, was mixed with 300 mL of methanol and the mixture was refluxed for 24 h to give white precipitate, which was washed twice with distilled water. The obtained precipitate was dried at 70° C. for 6 h and then heated to 150° C. for 6 h. The final half white mass was mixed with requisite amount of PIB dispersant and group II base oil in a ratio 3.3 to 1, dispersant and Zn metal in a ratio 30 to 1 so as to obtain final Zn metal concentration 2.5 Wt % in the total concentrate. This method of making dispersion is Ex situ approach.

(b) 0.31 g of commercial ZnO was mixed with required amount of PIB based dispersant and group II base oil to give final concentrate that contains 2.5 Wt % Zn. This method of making dispersion is Mixing approach.

Heat-Cool-Heat Cycle Method

The concentrate prepared in the above example 7a was mixed with group II base oil to give final blend containing Zn metal concentration of 500 ppm and the blend was heated to 230° C. soaked for 5 min at heating rate of 10-20K/min and cooling down normally to −20° C. then heated again to 230° C. This heat-cool-heat cycle was also performed for ZnO blend made from concentrate prepared via in situ method by example 2.

Example 8

Comparative data for comparing the stability of ZnO prepared by ex situ preparation method and in situ preparation method according to the present invention and Heat-Cool-Heat cycle test data of ZnO prepared by ex situ preparation method and in situ preparation method according to the present invention.

TABLE 3

The storage stability and clarity of ex situ/mixing and in situ ZnO dispersion and accelerated stability between in situ and ex situ prepared ZnO dispersion.

| Storage stability for a week* | | Dispersion clarity* | | Accelerated Stability, Heat-Cool-Heat Cycle* | |
|---|---|---|---|---|---|
| Ex situ/Mixing | In situ | Ex situ/Mixing | In situ | Ex situ | In situ |
| 2/1 | 5 | 1/1 | 5 | 2 | 5 |

*Rating given in 5 points scale; 5—excellent, 4—very good, 3—good, 2—fair, 1—below fair.
(a) Comparison of standard Lattice plane and the calculated lattice plane for PXRD indicating the complete conversion to ZnO;

TABLE 4

| Lattice spacing, d (Å) | | |
|---|---|---|
| | PXRD | |
| Standard ZnO | LBZ heated at 150° C./6 h | HRTEM LBZ heated under vacuum in Oil |
| 2.8143 | 2.8194 | — |
| 2.6033 | 2.6069 | 2.5900 |
| 2.4759 | 2.4798 | — |

The additive concentrate of the present invention is a greener or environmentally benign and would be compatible with depolluting systems or emission treatment system in the engine tail. Zn containing concentrate or oil composition would replace partially or completely organo S and P based ZDDP as an antiwear additive and thus it would be mixed with lubricant formulation where low SAPS are desired.

We claim:

1. A process for in situ synthesis of dispersion of ZnO nanoparticles in an oil additive composition, wherein the process comprises the steps of:
   a) dissolving a zinc salt in an alcoholic solvent and heating to 60-120° C. for 6-48 hours to obtain a suspension;
   b) centrifuging the suspension as obtained in step (a) and washing with deionized water to obtain a precipitate of layered base zinc (LBZ);
   c) dispersing the layered base zinc precipitate as obtained step (b) in an alcohol and adding to base oil containing a dispersant;
   d) refluxing the mixture to obtain a colloidal suspension; and
   e) evacuating the colloidal suspension at room temperature and heating at 60-90° C., followed by heating to 90-140° C. for 45 to 120 minutes to obtain a dispersion of ZnO in the oil medium.

2. The process as claimed in claim 1, wherein the zinc salt is selected from hydrous or anhydrous form of zinc salt, selected from zinc acetate, zinc nitrate, zinc chloride, zinc sulfate, zinc hydroxide (hydrotalcite), zinc hydroxy carbonate or hydrozincite, zincite and wurtzite.

3. The process as claimed in claim 1, wherein the alcoholic solvent is selected from $C_1$ to $C_3$ alcohols.

4. The process as claimed in claim 1, wherein the ratio of zinc salt and the alcoholic solvent ranges from 0.05 to 15:1 to 740.

5. The process as claimed in claim 1, wherein heating in step (a) is performed to 90° C. in an autoclave or refluxing in a glass reactor.

6. The process as claimed in claim 1, wherein washing in step (b) is performed twice with deionized water.

7. The process as claimed in claim 1, wherein the alcohol in step (c) is selected from $C_1$-$C_3$ alcohols.

8. The process as claimed in claim 1, wherein the amount of the dispersant in the base oil ranges from 40-78%.

9. The process as claimed in claim 1, wherein the layered basic zinc salt is selected from layered basic zinc acetate, layered basic zinc nitrate, layered basic zinc chloride, layered basic zinc sulfate, layered zinc hydroxide (hydrotalcite), zinc hydroxy carbonate or hydrozincite, zincite and wurtzite.

10. The process as claimed in claim 1, wherein the dispersant is selected from PIB dispersants, Phosphorodithioic acid; Ethyl hexanoic acid or fatty acids like stearic, oleic acids, sorbitane mono oleate (SPAN 80), sorbitane mono laurate (SPAN 20), sorbitane mono stearate (SPAN 60), Tween 20 (polyoxyethylenesorbitane mono laurate), Tween 60 (polyoxyethylenesorbitane mono stearate), Tween 80 (polyoxyethylenesorbitane mono oleate), diethanolamide fatty acid and fatty acid mono glyceride.

11. The process as claimed in claim 1, wherein the base oil is a mineral oil selected from the group consisting of group I, group II, group III, group IV, group V and synthetic oils.

* * * * *